US011729658B2

(12) United States Patent
Han et al.

(10) Patent No.: US 11,729,658 B2
(45) Date of Patent: *Aug. 15, 2023

(54) PDCP PACKET-BASED DDDS FRAME TRANSMISSION

(71) Applicant: Apple Inc., Cupertino, CA (US)

(72) Inventors: Jaemin Han, Hillsboro, OR (US); Yujian Zhang, Beijing (CN); Sudeep Palat, Cheltenham (GB); Alexander Sirotkin, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 17/315,952

(22) Filed: May 10, 2021

(65) Prior Publication Data

US 2021/0266779 A1 Aug. 26, 2021

Related U.S. Application Data

(63) Continuation of application No. 16/299,389, filed on Mar. 12, 2019, now Pat. No. 11,006,312.

(60) Provisional application No. 62/653,809, filed on Apr. 6, 2018.

(51) Int. Cl.
*H04W 28/02* (2009.01)
*H04W 28/04* (2009.01)
*H04W 92/12* (2009.01)
*H04W 88/08* (2009.01)
*H04W 80/02* (2009.01)

(52) U.S. Cl.
CPC ....... *H04W 28/0263* (2013.01); *H04W 28/04* (2013.01); *H04W 80/02* (2013.01); *H04W 88/085* (2013.01); *H04W 92/12* (2013.01)

(58) Field of Classification Search
CPC . H04W 28/0263; H04W 28/04; H04W 80/02; H04W 88/085; H04W 92/12
See application file for complete search history.

(56) References Cited

U.S. PATENT DOCUMENTS

| | | |
|---|---|---|
| 2005/0147040 A1 | 7/2005 | Vayanos et al. |
| 2009/0245201 A1 | 10/2009 | Motegi et al. |
| 2016/0128110 A1 | 5/2016 | Sirotkin et al. |
| 2016/0156548 A1 | 6/2016 | Pazhyannur et al. |
| 2016/0302110 A1 | 10/2016 | Baboescu et al. |
| 2016/0337254 A1 | 11/2016 | Karaki et al. |
| 2016/0338068 A1 | 11/2016 | Cheng et al. |
| 2017/0055313 A1 | 2/2017 | Sharma et al. |

(Continued)

*Primary Examiner* — Afshawn M Towfighi
(74) *Attorney, Agent, or Firm* — Kowert, Hood, Munyon, Rankin & Goetzel, P.C.

(57) ABSTRACT

Systems and methods of providing feedback when a specific PDU is successfully delivered or transmitted are described. The node hosting PDCP entity indicates triggering of a DDDS frame from the remote corresponding node. Rather than immediately triggering transmission of a DDDS frame, the node hosting PDCP entity indicates triggering based on successful delivery of a PDU having a specific SN, as long as in-sequence delivery or transmission of PDUs up to the specific SN was successful. The DDDS frame is transmitted once the corresponding node determines that the PDU having the SN was successfully delivered or transmitted. After reporting by the DDDS frame, the QoS flow associated with the PDUs is remapped from a source DRB to a target DRB.

20 Claims, 4 Drawing Sheets

(56) References Cited

U.S. PATENT DOCUMENTS

| | | | |
|---|---|---|---|
| 2017/0135023 A1 | 5/2017 | Jung et al. | |
| 2017/0215173 A1 | 7/2017 | Zhu et al. | |
| 2018/0206173 A1* | 7/2018 | Virtej | H04W 40/02 |
| 2018/0255499 A1 | 9/2018 | Loehr et al. | |
| 2019/0200273 A1* | 6/2019 | Pedersen | H04L 69/22 |
| 2020/0404106 A1* | 12/2020 | Belling | H04W 8/10 |
| 2021/0211939 A1* | 7/2021 | Teyeb | H04W 28/12 |

* cited by examiner

PDCP PACKET-BASED DDDS FRAME TRANSMISSION

PRIORITY CLAIM

This application is a continuation of U.S. patent application Ser. No. 16/299,389, filed Mar. 12, 2019, which claims the benefit of priority to under 5 U.S.C. 119(e) to U.S. Provisional Patent Application Ser. No. 62/653,809, filed Apr. 6, 2018 both of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to cellular networks, including Third Generation Partnership Project Long Term Evolution (3GPP LTE) networks and LTE advanced (LTE-A) networks, $4^{th}$ generation (4G) networks and $5^{th}$ generation (5G) New Radio (NR) (or next generation (NG)) networks. Some embodiments relate to quality of service (QoS) flow remapping in NR.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. As per the norm, with the advent of any new technology, the introduction of a complex new communication system engenders a large number of issues to be addressed both in the system itself and in compatibility with previous systems and devices. Such issues arise, for example, in data radio bearers (DRBs) in split NR deployments in which NG networks and devices are used in conjunction with earlier networks and devices.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
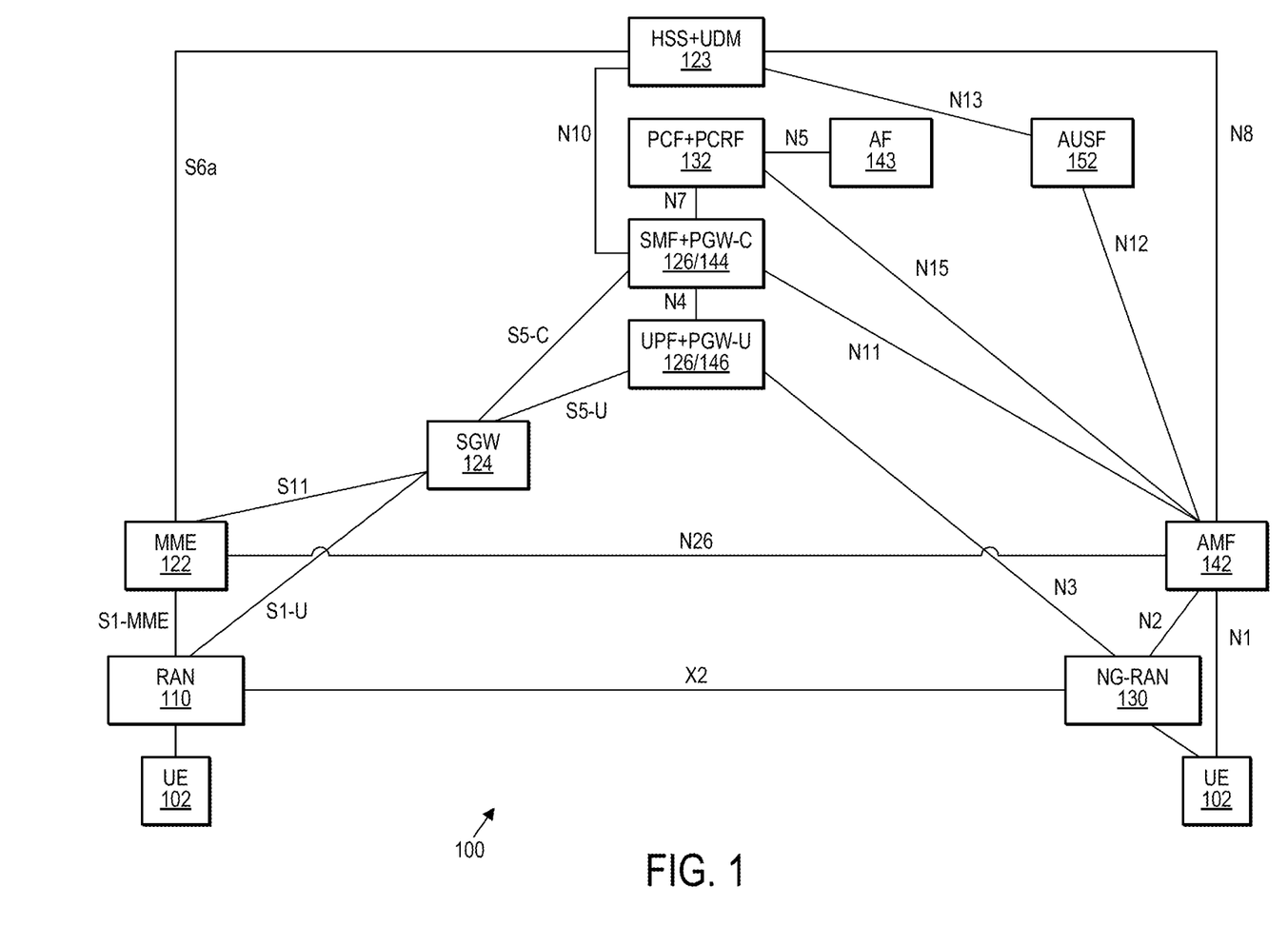
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform. e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UF 102 may have multiple 5G sessions Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
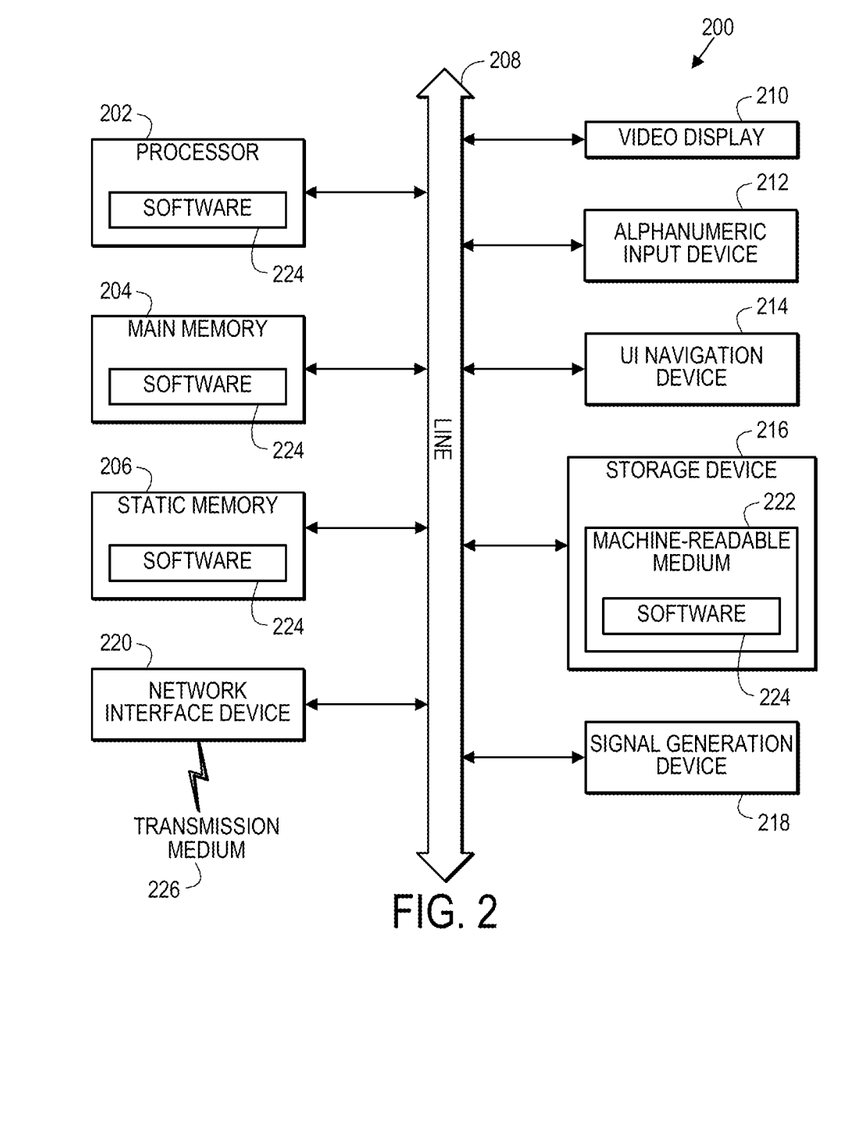
FIG. 2 illustrates a block diagram of a communication device in accordance with some embodiments.

FIG. 2 illustrates a block diagram of a communication device in accordance with some embodiments. In some embodiments, the communication device may be a peer machine in peer-to-peer (P2P) (or other distributed) network environment. The communication device 200 may be a specialized computer, a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Figure 3:
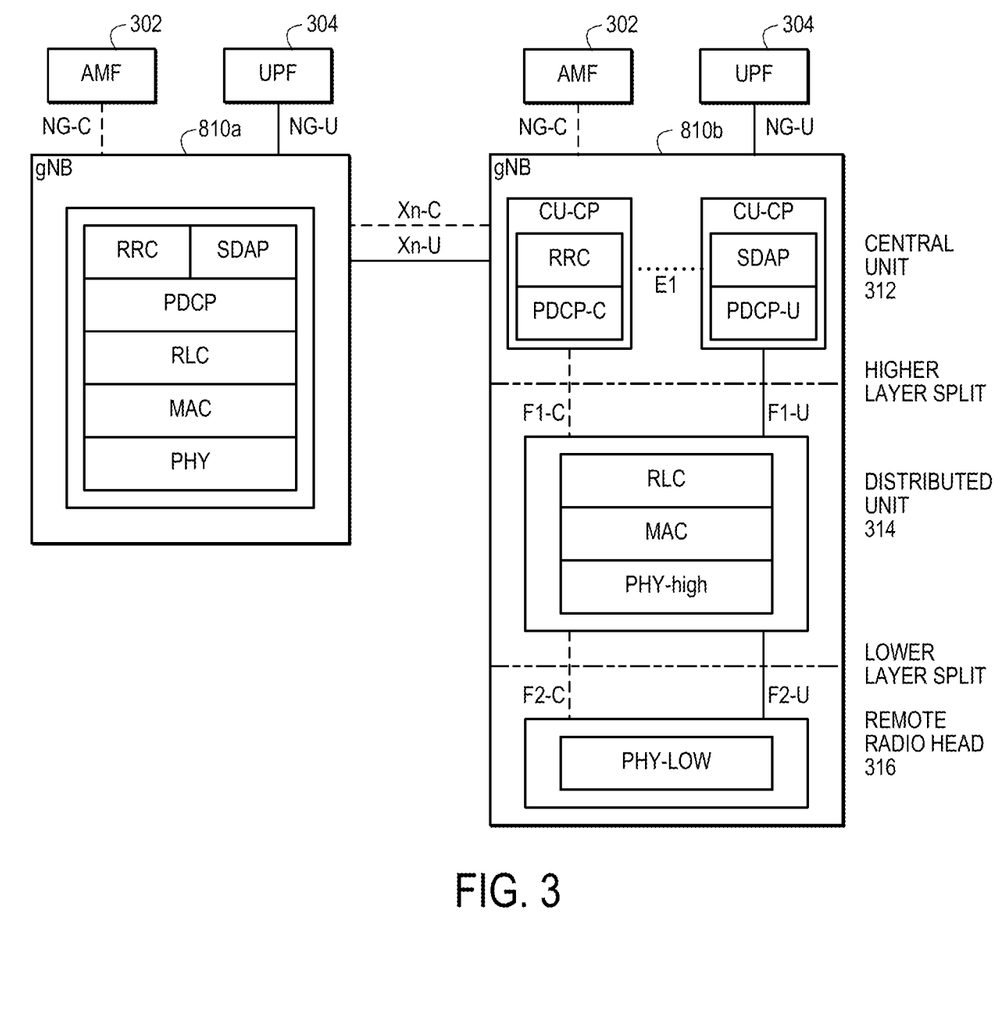
FIG. 3 illustrates interconnections for gNBs in accordance with some embodiments.

One advantage of the NR system is that the UE may be able to take advantage of a dual-connectivity (DC) framework, in which the UE may be connected simultaneously with a master NodeB (MNB) and a secondary NodeB (SNB). The MNB and SNB may be eNBs, gNBs, or a combination thereof, for example. In some embodiments, the MNB may use a single SNB for a bearer associated with the UE. In some embodiments, the MNB may service the UE, so that all UL and DL data flow associated with the bearer is controlled by the MNB. For example, the MNB may transmit packets to the SNB for delivery to the UE. The SNB may provide the MNB with information about packet transmission or delivery to permit the MNB to control packet flow to the SNB to avoid overflow or underflow buffer issues associated with packet delivery to the UE. The packet and control flow may be transmitted over an X2 interface when the MNB and SNB are eNBs over an Xn interface when the MNB and SNB are gNBs (although a combination of eNB and gNB may be used as well). FIG. 3 illustrates interconnections for gNBs in accordance with some embodiments.

As shown in FIG. 3, the gNBs 310*a*, 310*b* of the NG-RAN 310 may each be connected with different AMFs 302 and UPFs 304 through an NG-Control plane (NG-C or, as indicated in FIG. 1, N2) interface and an NG-User plane (NG-U or, as indicated in FIG. 1, N3) interface, respectively. In some embodiments, the gNBs 310*a*, 310*b* The gNBs 310*a*, 310*b* may be connected with each other via dual Xn interfaces for control plane signaling (Xn-C) and user plane signaling (Xn-U). The control plane functions of the Xn-C interface may include interface management and error handling functionality, connected mode mobility management, support of RAN paging and dual connectivity functions, among others. Examples of the interface management and error handling functionality include setup, reset, removal and configuration update of the Xn interface. Examples of connected mode mobility management include handover procedures, sequence number status transfer and UE context retrieval. Examples of dual connectivity functions include secondary node addition, reconfiguration, modification, and release of the secondary node. The user plane functions of the Xn-U interface may include both data forwarding and flow control between the gNBs 310*a*, 310*b*.

Each of the gNBs 310*a*, 310*b* may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB 310*a*, 310*b* may be distributed in different units—a Central Unit (CU) 312, at least one Distributed Unit (DU) 314, and a Remote Radio Head (RRH) 316. The CU 312 may provide functionalities such as the control the transfer of user data, and effect mobility control, radio access network sharing, positioning, and session management, except those functions allocated exclusively to the DU 314.

As shown in FIG. 3, the higher protocol layers (PDCP and RRC for the control plane/PDCP and SDAP for the user plane) may be implemented in the CU 312, and the RLC and MAC layers may be implemented in the DU 314. The PHY layer may be split, with the higher PHY layer also implemented in the DU 314, while the lower PHY layer is implemented in the Remote Radio Head 316. The CU 312, DU 314 and RRH 316 may be implemented by different manufacturers, but may nevertheless be connected by the appropriate interfaces therebetween. The CU 312 may be connected with multiple DUs 314.

The interfaces within the gNB include the E1, and fronthaul (F) F1 and F2 interfaces. The E1 Interface may be between a CU control plane and the CU user plane and thus may support the exchange of signaling information between the control plane and the user plane. The E1 Interface may separate Radio Network Layer and Transport Network Layer and enable exchange of UE associated information and non-UE associated information. The F1 interface may be disposed between the CU 312 and the DU 314. The CU 312 may control the operation of the DU 314 over the F1 interface.

As the signaling in the gNB is split into control plane and user plane signaling, the F1 interface may be split into the F1-C interface for control plane signaling and the F1-U interface for user plane signaling, which support control plane and user plane separation. The F1 interface, as above may separate the Radio Network and Transport Network Layers and enable exchange of UE associated information and non-UE associated information.

The F2 interface may be between the lower and upper parts of the NR PHY layer. The F2 interface may also be separated into F2-C and F2-U interfaces based on control plane and user plane functionalities.

Either of the gNBs 310*a*, 310*b* of the NG-RAN 310 may provide an over-the-air (OTA) connection to a UE. A QoS flow may be used for both UL and DL user plane traffic. In NR, the QoS flows may be guaranteed flow bit rate (GBR) or non-GBR. Packets may be classified and marked using a QoS Flow Identifier (QFI). The NG-RAN 310 may determine the mapping relationship between QoS flow and DRB for UL and DL traffic, and multiple QoS flows may be mapped to a single DRB. The QoS flow may be a default QoS flow provided by the network during PDU session establishment. In some embodiments, the UE may receive QoS rules for certain QoS flows during PDU session establishment. Alternatively, if neither a default QoS flow nor explicit signaling for configuring QoS rules is used, reflective QoS can be used (for non-GBR flows). In reflective QoS, the network may determine the DL QoS flow and insert the QFI in the DL packets in a DRB. The UE derives the QFI to DRB mapping for UL PDCP packets based on the DL PDCP packets received within the DRB and apply the same filters for mapping uplink QoS flows to DRBs. The UL PDCP packets may include an indication of successful delivery of the DL PDCP packets. Flow control for RAN interfaces may be indicated in a Downlink (DL) Data Delivery Status (DDDS) frame (message).

The gNB 310a, 310b may also remap a QoS flow into another DRB whenever desired. Remapping occurs when the gNB 310a, 310b changes the mapping relation between a QoS flow and a DRB, i.e., a QoS flow is reconfigured to be carried on a different DRB. The remapping may take place when, for example, the gNB 310a, 310b wants to move a QoS flow in the default DRB to a dedicated DRB or when the DRB used for a QoS flow becomes unavailable due to the change of radio environment, such as during handover. The remapping may be from a non-shared DRB (only 1 flow within before remapping) to a new DRB (no other flow within before remapping), from a non-shared DRB to an existing DRB (other flow(s) within before remapping), from a shared DRB (more than 1 flow within before remapping) to a new DRB, or from a shared DRB to an existing DRB.

During QoS flow to DRB remapping, a QoS flow may be remapped to a target DRB that is more suitable. This means that the latency of the target DRB may be shorter than that of the source DRB. In this case, a DL PDCP packet sent over the target DRB may arrive earlier than a previous one sent over the source DRB. This may be problematic when a DL QoS flow requires in-order delivery (delivery of packets in order). In this case, when the QoS flow is to be remapped, the gNB 310a, 310b may make sure that the last PDCP packet of a to-be-remapped QoS flow is successfully delivered before the gNB 310a, 310b actually remaps the QoS flow from the source DRB to the target DRB.

In some NR deployments however, a successful delivery indication may be provided from a distant location. One example is the CU-DU architecture shown in FIG. 3, in which the CU hosting the PDCP entity may be located in the cloud and may be remote from the DU and RRH through which the gNB communicates with the UE. The DU may determine whether delivery of a particular packet to the UE was successful based on feedback provided from the UE (e.g., an ACK/NACK). Note that in other implementations both the CU and DU may be dedicated hardware, albeit in different locations. Another example is a dual connectivity scenario, in which a QoS flow to be remapped in a master node (MN) or secondary node (SN) is served by, e.g. a MN-terminated secondary cell group (SCG) bearer or a SN-terminated master cell group (MCG) bearer. In such deployments, a large remapping delay may be inevitable, resulting in a service interruption.

Figure 4:
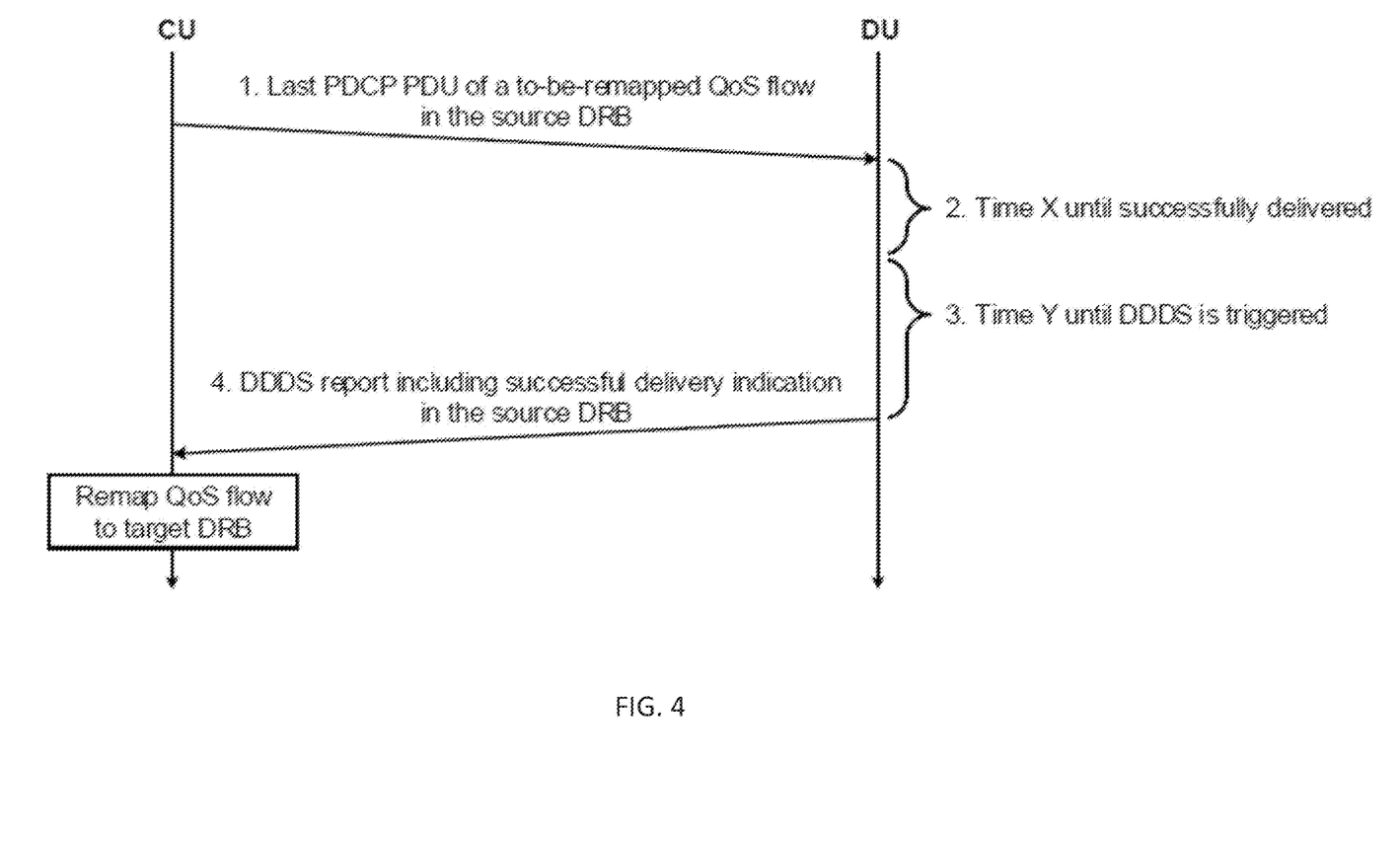
FIG. 4 illustrates QoS remapping in accordance with some embodiments.

FIG. 4 illustrates QoS remapping in accordance with some embodiments. The use of the DDDS frame from the DU to the CU to provide the successful delivery indication at the DU may increase the remapping delay in the above deployments as, generally, the timing of DDDS feedback triggering is left up to implementation. Polling may be used, but the intention is to send the DDDS frame immediately when polled, as opposed to when a specific PDCP packet (e.g. the last PDCP packet above) has been successfully delivered to the UE. Thus, with a polling-triggered DDDS frame, the CU may be unaware of whether or not the last PDCP packet has been successfully delivered and thus whether or not remapping of the QoS flow may be problematic. Based on the current flow control mechanisms, a node hosting the PDCP entity (the CU shown in FIG. 4) may wait for an extended amount of time to know whether the last PDCP packet of a to-be-remapped QoS flow in the source DRB is successfully delivered (to the UE), until the DDDS frame including such an indication is triggered. As shown in FIG. 4, the entire delay may include the round trip travel (RTT) time between the CU and the DU (1 and 4), the delay (time X) it takes for the last packet to be successfully delivered at the DU upon arrival, and the delay (time Y) until transmission of the DDDS frame including an indication of successful delivery is triggered.

Various mechanisms are disclosed herein to minimize or avoid remapping delay in NR deployments for which the SDAP/PDCP and lower layer protocol entities are located separately and thus a flow control feedback mechanism is used to indicate successful delivery of the PDCP packets to the UE. In particular, in some embodiments the flow control may be enhanced to trigger DDDS feedback when a specific PDCP packet is successfully delivered or transmitted, thereby eliminating the up-to-implementation time Y until feedback of successfully delivery indication is triggered. In other embodiments, a node hosting the PDCP entity may transmit PDCP PDUs of both the source and target DRBs during QoS flow remapping, but may inform the corresponding node to only start delivering in the target DRB once a specific PDCP sequence number (SN) in the source DRB is successfully delivered to the UE or transmitted from the DU. This may avoid the RTT delay, thus simulating QoS flow remapping as if the protocol layers are co-located, however, adding inter-DRB operation in the corresponding node with potential blocking of other QoS flows transmitted over the target DRB.

In the former embodiment, as feedback of a successful delivery originates from a distant location and thus there is a roundtrip delay, a straightforward way to minimize the QoS flow remapping delay is to remove the up-to-implementation time Y. This may allow the CU or a node hosting the PDCP entity to trigger feedback as soon as the last PDCP packet of a to-be-remapped QoS flow is successfully delivered. Note that the time X in FIG. 4, i.e., the time until the last packet is successfully delivered exists during QoS flow remapping even if the protocol layers are co-located.

As described above, the current DDDS triggering mechanism is either up to implementation or by polling. Although it may be desirable to send the DDDS report immediately when polled, the timing of transmission of the DDDS may not be immediate. Moreover, triggering the DDDS feedback when a specific PDCP packet is successfully delivered is desired, polling may be insufficient—it may be too early or too late given that the CU or a node hosting the PDCP entity may be unable to determine when exactly the specific DL PDCP packet would be successfully delivered.

In this case, the up-to-implementation time Y until feedback of successfully delivery indication is triggered may be eliminated, thereby minimizing the QoS remapping delay (given a RTT). In addition, flow-level in-order delivery can be guaranteed. There is also no impact on other QoS flows having been transmitted over the target DRB. However, the RTT may continue to be incurred during QoS flow remapping, which may result in a service interruption if the RTT is large due to the particular deployment.

Different signaling implementations may be used to trigger the DDDS feedback when a specific PDCP packet is successfully delivered for this embodiment. In some embodiments, the control plane may be used to trigger the DDDS feedback. In some embodiments, the user plane may be used to trigger the DDDS feedback, either using a new DL User Data frame introduced for this purpose or using an existing DL User Data Frame with enhancements.

An example of an existing DL User Data frame that triggers feedback when carried with a NR PDCP PDU that is successfully delivered or transmitted is provided below. The DL USER DATA (PDU Type 0) frame may be:

| Bits | | | | | | | | Number |
|---|---|---|---|---|---|---|---|---|
| 7 | 6 | 5 | 4 | 3 | 2 | 1 | 0 | of Octets |
| PDU Type (=0) | | | | Report delivered1 | DL Discard Blocks | DL Flush | Report polling | 1 |
| NR-U Sequence Number | | | | | | | | 3 |
| DL discard NR PDCP PDU SN | | | | | | | | 3 |
| DL discard Number of blocks | | | | | | | | 1 |
| DL discard NR PDCP PDU SN start (first block) | | | | | | | | 3 |
| Discarded Block size (first block) | | | | | | | | 1 |
| ... | | | | | | | | |
| DL discard NR PDCP PDU SN start (last block) | | | | | | | | 3 |
| Discarded Block size (last block) | | | | | | | | 1 |
| Spare extension | | | | | | | | 0-4 |

The Report Delivered1 parameter may indicate that the node hosting the NR PDCP entity requests providing the DL delivery status report when the NR PDCP PDU carried together with the DL User Data frame has been successfully delivered or transmitted. The field length may be bit and the value range may be: {0=Downlink Data Delivery Status report not requested, 1=Downlink Data Delivery Status report requested}. Note that the Report Delivered1 parameter may be provided in a different octet, but, in some embodiments, the bit placement of the Report Delivered1 parameter may be in the same location within that octet. In addition, the number of octets used for each entry (in each DL User Data frame example provided herein) other than the first octet may be 0 or the number provided, dependent on whether the information is present in the DL User Data frame.

An example of a DL User Data frame that provides a specific NR PDCP PDU SN and triggers feedback when the PDCP PDU of this SN is successfully delivered or transmitted is provided below. The DL USER DATA (PDU Type 0) frame may be:

| Bits | | | | | | | | Number |
|---|---|---|---|---|---|---|---|---|
| 7 | 6 | 5 | 4 | 3 | 2 | 1 | 0 | of Octets |
| PDU Type (=0) | | | | Report delivered2 | DL Discard Blocks | DL Flush | Report polling | 1 |
| NR-U Sequence Number | | | | | | | | 3 |
| DL discard NR PDCP PDU SN | | | | | | | | 3 |
| DL discard Number of blocks | | | | | | | | 1 |
| DL discard NR PDCP PDU SN start (first block) | | | | | | | | 3 |
| Discarded Block size (first block) | | | | | | | | 1 |
| ... | | | | | | | | |
| DL discard NR PDCP PDU SN start (last block) | | | | | | | | 3 |
| Discarded Block size (last block) | | | | | | | | 1 |
| DL report NR PDCP PDU SN | | | | | | | | 3 |
| Spare extension | | | | | | | | 0-4 |

The Report Delivered2 parameter may indicate the presence of DL report NR PDCP PDU SN (i.e., transmit the DDDS frame when the DL NR PDCP PDU SN has been successfully received). The field length may be 1 bit and the value range may be: {0=DL report NR PDCP PDU SN not present, 1=DL report NR PDCP PDU SN present}.

The DL report NR PDCP PDU SN parameter may indicate that the node hosting the PDCP entity requests providing the DL delivery status report when the NR PDCP PDU with this sequence number has been successfully delivered to the UE. In some embodiments, the DL report NR PDCP PDU SN parameter may indicate the request when the NR PDCP PDU with this sequence number has been transmitted from the corresponding node instead of delivered at the UE. The field length may be 3 octets and the value range may be: $\{0 \ldots 2^{24}-1\}$.

In either embodiment above, the DDDS frame may be transmitted to the CU when the NR PDCP PDU with the SN provided in the DL report NR PDCP PDU SN parameter is delivered or transmitted. The signaling implementation to provide feedback when triggered may not be limited to the existing DDDS frame. Since buffer size reporting (the desired size for the data bearer and the minimum size for the UE) is mandatory in DDDS, a new user-plane frame other than DDDS can be introduced to provide feedback to the node hosting the PDCP entity when a specific PDCP packet is successfully delivered. In addition, in some embodiments, the DDDS frame sent as a response to a specific DL report NR PDCP PDU SN may be sent only when all PDCP PDU SNs up to this DL report NR PDCP PDU have been successfully delivered in-sequence.

In another embodiment, the node hosting the PDCP entity may transmit PDCP PDUs of both source and target DRBs during QoS flow remapping. However, the node hosting the PDCP entity may inform the corresponding node to only start delivering in the target DRB once a specific PDCP SN in the source DRB is successfully delivered. For example, suppose a QoS flow is remapped from DRB1 to DRB2, the last packet of the QoS flow in DRB1 has PDCP SN of x, and the first packet of the QoS flow in DRB2 has PDCP SN of y. The CU may indicate that all PDUs in DRB2 starting from SN y cannot be transmitted to the UE until the PDCP PDU of SN x in DRB1 has been successfully delivered to the UE. In this way, the PDCP PDUs of the source and target DRBs during QoS flow remapping may already be buffered in the DU, thus effectively eliminating providing feedback to the CU and saving the RTT between the CU and DU. In FIG. 4, RTT and the time Y may be effectively removed during QoS flow remapping, leaving only the time X—as if protocol layers are co-located, i.e., the time until the last packet is successfully delivered or transmitted in the source DRB. However, if there have been other QoS flows previously transmitted over the target DRB, then delivery of the other QoS flows in the target DRB may be blocked, although temporarily (until SN x of source DRB is successfully delivered). In addition, inter-DRB operation during QoS flow remapping (which may be assumed to be done only in SDAP layer) may also be required in the DU or the corresponding node.

The DU or the corresponding node may not have to block other QoS flows transmitted over target DRB (i.e., PDCP PDUs with a SN more than y), because the target DRB PDCP entity may allocate PDCP SNs continuously and due to PDCP window, the transmitter may be able to tolerate transmitting PDCP packet having a SN more than Y for a limited time. Also, from the receiver's perspective, any PDCP packet having SN greater than Y may be unable to be delivered to the upper layers due to the reordering and in-order delivery of the PDCP layer. However, blocking may still happen if the time X in FIG. 4 (i.e., the time until SN x of source DRB is successfully delivered) takes more than transmitting half of the target DRB PDCP SN space (as otherwise it may create Hyper Frame Number (HFN) desynch in the target DRB).

The signaling implementations to provide information of the last PDCP packet in the source DRB and the first PDCP packet in the target DRB may include providing the information via the control plane or via the user plane. In the latter case, similar to the above a new DL User Data frame may be introduced for this specific purpose, or an existing DL User Data Frame with enhancements may be used.

One example of a DL User Data frame that indicates the source DRB ID and the SN of the last PDCP packet when transferring the first PDCP packet of the remapped QoS flow in the target DRB is provided below. This example may include the NR PDCP PDU SN of the first packet in the target DRB explicitly, instead of relying on the NR PDCP PDU that is transferred together with this frame.

The DL USER DATA (PDU Type 0) frame may be:

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | DL remap1 | DL Discard Blocks | DL Flush | Report polling | 1 |
| NR-U Sequence Number | | | | | | | | 3 |
| Source DRB ID | | | | | | | | 1 |
| NR PDCP PDU SN for the Source DRB | | | | | | | | 3 |
| DL discard NR PDCP PDU SN | | | | | | | | 3 |
| DL discard Number of blocks | | | | | | | | 1 |
| DL discard NR PDCP PDU SN start (first block) | | | | | | | | 3 |
| Discarded Block size (firstblock) | | | | | | | | 1 |
| . . . | | | | | | | | |
| DL discard NR PDCP PDU SN start (last block) | | | | | | | | 3 |
| Discarded Block size (last block) | | | | | | | | 1 |
| Spare extension | | | | | | | | 0-4 |

The DL remap1 parameter may indicate the presence of the source DRB ID and the corresponding NR PDCP PDU sequence number for the source DRB such that the corresponding node has to transmit the NR PDCP PDU carried together with this frame only when the PDCP packet in the source DRB ID with the corresponding NR PDCP PDU for the source DRB has been successfully delivered or transmitted. The field length may be 1 bit and the value range may be: {0=Information for the source DRB ID and the corresponding NR PDCP PDU SN not present, 1=Information for the source DRB ID and the corresponding NR PDCP PDU SN present}.

Another example of a DL User Data frame that indicates the target DRB ID and the SN of the first PDCP packet when transferring the last PDCP packet of the to-be-remapped QoS flow in the source DRB is provided below. This example may include the NR PDCP PDU SN of the first packet in the target DRB explicitly, instead of relying on the NR PDCP PDU that is transferred together with this frame.

The DL USER DATA frame (PDU Type 0) may be:

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | DL remap2 | DL Discard Blocks | DL Flush | Report polling | 1 |
| NR-U Sequence Number | | | | | | | | 3 |
| Target DRB ID | | | | | | | | 1 |
| NR PDCP PDU SN for the Target DRB | | | | | | | | 3 |
| DL discard NR PDCP PDU SN | | | | | | | | 3 |
| DL discard Number of blocks | | | | | | | | 1 |
| DL discard NR PDCP PDU SN start (first block) | | | | | | | | 3 |
| Discarded Block size (first block) | | | | | | | | 1 |
| . . . | | | | | | | | |
| DL discard NR PDCP PDU SN start (last block) | | | | | | | | 3 |
| Discarded Block size (last block) | | | | | | | | 1 |
| Spare extension | | | | | | | | 0-4 |

The DL remap2 parameter may indicate the presence of the target DRB ID and the corresponding NR PDCP PDU sequence number for the target DRB such that the corresponding node has to transmit the target DRB PDCP packet associated with the included Sequence Number for the target DRB after the NR PDCP PDU carried together with this frame has been successfully delivered or transmitted. The field length may be 1 bit and the value range may be: {0=Information for the target DRB ID and the corresponding NR-U SN not present, 1=Information for the target DRB ID and the corresponding NR-U SN present}.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory; and
    processing circuitry in communication with the memory and arranged to:
        receive a Downlink (DL) User Data Frame from an other node hosting a New Radio (NR) Packet Data Convergence Control (PDCP) entity, wherein the DL User Data Frame includes a DL report NR PDCP protocol data unit (PDU) sequence number (SN) parameter in the DL User Data Frame, wherein the DL report NR PDCP PDU SN indicates that the other node requests providing a down link delivery status report based on a NR PDCP PDU with the DL report NR PDCP PDU SN; and
        when the NR PDCP PDU with the DL report NR PDCP PDU SN is successfully delivered to a UE, generate, for transmission to the other node, a DL Data Delivery Status (DDDS) frame that indicates the successful delivery.

2. The apparatus of claim 1,
wherein the DL User Data Frame includes a report delivered parameter that indicates a presence of the DL report NR PDCP PDU SN.

3. The apparatus of claim 2,
wherein the report delivered parameter is provided in bit position 3 of an octet of the DL User Data Frame.

4. The apparatus of claim 1,
wherein the other node is a central unit of a $5^{th}$ generation NodeB (gNB); and
and wherein the apparatus is comprised in a distributed unit of the gNB.

5. The apparatus of claim 4,
wherein the central unit is remote from the distributed unit.

6. The apparatus of claim 1,
wherein the NR PDCP PDU is a last NR PDCP PDU of a to-be-remapped Quality of Service (QoS) flow.

7. The apparatus of claim 1,
wherein the report delivered parameter is provided in a fifth most significant bit of one of the first two octets.

8. The apparatus of claim 1,
wherein the DL report NR PDCP PDU SN parameter is 3 octets provided between a discarded block size octet and padding in the DL User Data Frame.

9. A non-transitory computer-readable storage medium that stores instructions for execution by one or more processors of a node, wherein, when the instructions are executed, the one or more processors configure the node to:
receive a Downlink (DL) User Data Frame from an other node hosting a New Radio (NR) Packet Data Convergence Control (PDCP) entity, wherein the DL User Data Frame includes a DL report NR PDCP protocol data unit (PDU) sequence number (SN) parameter in the DL User Data Frame, wherein the DL report NR PDCP PDU SN indicates that the other node requests providing a down link delivery status report based on a NR PDCP PDU with the DL report NR PDCP PDU SN; and
when the NR PDCP PDU with the DL report NR PDCP PDU SN is successfully delivered to a UE, generate, for transmission to the other node, a DL Data Delivery Status (DDDS) frame that indicates the successful delivery.

10. The non-transitory computer-readable storage medium of claim 9,
wherein the DL User Data Frame includes a report delivered parameter that indicates a presence of the DL report NR PDCP PDU SN.

11. The non-transitory computer-readable storage medium of claim 10,
wherein the report delivered parameter is provided in bit position 3 of an octet of the DL User Data Frame.

12. The non-transitory computer-readable storage medium of claim 9,
wherein the other node is a central unit of a $5^{th}$ generation Nodal (gNB); and
and wherein the node is a distributed unit of the gNB.

13. The non-transitory computer-readable storage medium of claim 12,
wherein the central unit is remote from the distributed unit.

14. The non-transitory computer-readable storage medium of claim 9,
wherein the NR PDCP PDU is a last NR PDCP PDU of a to-be-remapped Quality of Service (QoS) flow.

15. The non-transitory computer-readable storage medium of claim 9,
wherein the DL report NR PDCP PDU SN parameter is 3 octets provided between a discarded block size octet and padding in the DL User Data Frame.

16. A method, comprising:
a network node,
receiving a Downlink (DL) User Data Frame from an other node hosting a New Radio (NR) Packet Data Convergence Control (PDCP) entity, wherein the DL User Data Frame includes a DL report NR PDCP protocol data unit (PDU) sequence number (SN) parameter in the DL User Data Frame, wherein the DL report NR PDCP PDU SN indicates that the other node requests providing a down link delivery status report based on a NR PDCP PDU with the DL report NR PDCP PDU SN; and
when the NR PDCP PDU with the DL report NR PDCP PDU SN is successfully delivered to a UE, generating, for transmission to the other node, a DL Data Delivery Status (DDDS) frame that indicates the successful delivery.

17. The method of claim 16,
wherein the DL User Data Frame includes a report delivered parameter that indicates a presence of the DL report NR PDCP PDU SN.

18. Method of claim 17,
wherein the report delivered parameter is provided in bit position 3 of an octet of the DL User Data Frame.

19. Method of claim 16,
wherein the NR PDCP PDU is a last NR PDCP PDU of a to-be-remapped Quality of Service (QoS) flow.

20. Method of claim 16,
wherein the report delivered parameter is provided in a fifth most significant bit of one of the first two octets.

* * * * *